United States Patent
Lee

(10) Patent No.: US 7,594,045 B2
(45) Date of Patent: Sep. 22, 2009

(54) MEMORY CONTROL APPARATUS FOR DIGITAL SIGNAL PROCESSING

(75) Inventor: Yong-Hyun Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/450,289

(22) Filed: Jun. 12, 2006

(65) Prior Publication Data
US 2006/0230194 A1  Oct. 12, 2006

Related U.S. Application Data

(63) Continuation of application No. 10/686,270, filed on Oct. 16, 2003, now abandoned.

(30) Foreign Application Priority Data
Nov. 28, 2002  (KR) .......................... 2002-74893

(51) Int. Cl.
*G06F 3/00* (2006.01)
*G06F 15/00* (2006.01)

(52) U.S. Cl. .................. 710/38; 710/16; 712/28

(58) Field of Classification Search .......... 710/1, 710/15–19, 36, 38, 52, 100, 240, 242, 300, 710/301; 712/1, 28–30
See application file for complete search history.

(56) References Cited

U.S. PATENT DOCUMENTS 4,767,918 A  *  8/1988  Kushima et al. ............ 235/441

| 5,225,908 | A | 7/1993 | Lee |
| 5,430,496 | A | 7/1995 | Silverbook |
| 5,898,459 | A | 4/1999 | Smith et al. |
| 6,163,828 | A | 12/2000 | Landi et al. |
| 6,356,709 | B1 | 3/2002 | Abe et al. |
| 2001/0013131 | A1 | 8/2001 | Wang |
| 2003/0020814 | A1 | 1/2003 | Ono |

FOREIGN PATENT DOCUMENTS

| JP | 6068055 A | 3/1994 |
| KR | 1020020057544 A | 7/2002 |

OTHER PUBLICATIONS

The Authoritative Dictionary of IEEE Standards Terms; 2000; IEEE Press; Seventh Edition; p. 220.*

* cited by examiner

*Primary Examiner*—Alford W Kindred
*Assistant Examiner*—Richard Franklin
(74) *Attorney, Agent, or Firm*—Roylance, Abrams, Berdo & Goodman

(57) ABSTRACT

A memory control apparatus and method for operating a plurality of digital signal processors (DSPs) using a single memory slot and buffer are provided. Exemplary embodiments provide at least one DSP for processing different signals, a flash memory that can record and reproduce a digital signal, a plurality of selection switches located on signal lines between the DSP and the flash memory for switching the signals, a three-state buffer that selectively outputs insert information of the memory to the DSPs according to a control signal, a control unit for providing the control signal for controlling switching of the signals, and a key input unit for determining input/output operation modes. The control unit records and reproduces the data in the flash memory according to the operation mode determined through the key input unit.

8 Claims, 4 Drawing Sheets

MEMORY CONTROL APPARATUS FOR DIGITAL SIGNAL PROCESSING

CROSS-REFERENCE TO RELATED APPLICATIONS

This application is a continuation application of co-pending U.S. patent application Ser. No. 10/686,270, filed Oct. 16, 2003, now abandoned which claims benefit under 35 U.S.C. § 119(a) from Korean Patent Application No. 2002-74893, filed Nov. 28, 2002, in the Korean Intellectual Property Office. The entire contents of both applications are hereby incorporated by reference.

BACKGROUND OF THE INVENTION

1. Field of the Invention

The present invention relates to a memory control apparatus and method for digital signal processing. More particularly, the present invention relates to a system and method for operating a plurality of digital signal processors using one memory card.

2. Description of the Related Art

Generally, a digital signal processor (DSP) is used for real-time processing of a digital signal. The digital signal typically includes data representing a serial number or a digital value for indicating a corresponding analog signal. DSPs are used in diverse fields such as, for example, audio systems such as a small-sized disc player, radio communication systems such as a cellular phone, digital still cameras (DSC), and digital video cameras (DVC).

Recently, with the demand for combined appliances, the development of a dual appliance having two or more functions has increased remarkably. In particular, techniques for integrating a DVC for taking a moving image and a DSC for recording a still image into one appliance have been used significantly.

A conventional technique of integrating the DSC and DVC is illustrated in FIGS. 1 and 2. FIG. 1 is a perspective view of an apparatus for taking an image in which a digital still camera and a digital video camera are integrated. FIG. 2 is a block diagram of the apparatus illustrated in FIG. 1. Referring to FIGS. 1 and 2, the body 10 of the apparatus includes a DSC signal conversion unit 40, a DVC signal conversion unit 45, a still image codec unit 50, a moving image codec unit 65, a storage unit 60, an input unit 70, a display unit 80, and a control unit 90.

A camera part 20 includes a housing 15 rotatably installed on the body 10, a first camera 22 for taking a still image, and a second camera 24 for taking a moving image. The first camera 22 and the second camera 24 are arranged to face each other.

Accordingly, the camera part 20 rotates clockwise or counterclockwise at a predetermined angle on an rotating axis X, and it is preferable that the camera part 20 rotates to the extent that a DSC lens group 22*a* and a DVC lens group 24*a* maintain balance with an image-taking direction A. That is, as shown in FIG. 2, it is preferable that, if the housing 15 is manually rotated at an angle of 180°, the positions of the DSC lens group 22*a* and the DVC lens group 24*a* alternate directions in which they face.

The first camera 22 has a DSC lens group 22*a*, a DSC driving unit 22*b*, a DSC detection unit 22*c*, and a DSC image pickup unit 22*d*. The DSC lens group 22*a* is for taking a still image, and the DSC driving unit 22*b* moves a DSC zoom lens (not illustrated) and a DSC focus lens (not illustrated) under control of the control unit 90. The DSC detection unit 22*c* is a sensor for detecting the position of a lens under the control of control unit 90, and the DSC image pickup unit 22*d* converts the image signal of an object that has passed through the DSC zoom lens (not illustrated) and the DSC focus lens (not illustrated) into an electric image signal using a charge coupled device or any other suitable component.

The second camera 24 has a DVC lens group 24*a*, a DVC driving unit 24*b*, a DVC detection unit 24*c*, and a DVC image pickup unit 24*d*. Its operation is the same as that of the first camera 22.

The DSC signal conversion unit 40 and the DVC signal conversion unit 45 remove noise included in electric signals output from the DSC image pickup unit 22*d* and the DVC image pickup unit 24*c*, and amplify gains so that the converted electric image signals are output with a constant or a substantially constant level. Also, the DSC signal conversion unit 40 and the DVC signal conversion unit 45 convert the electric analog signals into digital image signals, and output automatic control data through digital processing.

The still image codec unit 50, under control of the control unit 90, compresses the still image signal output from the DSC signal conversion unit 40 using a compression system such as JPEG. The compressed still image data is stored in a storage medium, such as flash memory 62, of the storage unit 60.

The moving image codec unit 65, under control of the control unit 90, compresses the moving image signal output from the DVC signal conversion unit 45 using a compression system such as JPEG. The compressed moving image data is stored in a storage medium, such as tape 64, of the storage unit 60.

If a reproduction command signal for reproducing the stored image signal is input through the input unit 70, the still image codec unit 50 and the moving image codec unit 65 discontinue compression of the coded data stored in the flash memory 62 and tape 64, respectively, under control of the control unit 90.

For example, if a reproduction command signal for reproducing the still image signal is input through the input unit 70, the still image codec unit 50 discontinues the compression of the coded still image data stored in the flash memory 62, and outputs the still image data to the display unit 80.

The input unit 70 has an image-taking key 70*a* for providing an image-taking command signal to the control unit 90, and a plurality of manipulation buttons (not illustrated) for performing a plurality of functions. The display unit 80 has a viewfinder 82, and/or an LCD panel 84, provided on one side of the main body 10. The display unit 80 displays the image taken through the DSC 22 or DVC 24 or the compression-released image under control of the control unit 90.

The control unit 90 controls the entire operation of the image-taking apparatus using various kinds of control programs stored in the storage unit 60 and the automatic control data output from the DSC signal conversion unit 40 or the DVC signal conversion unit 45. The control unit 90 ascertains the selected image-taking mode by an output signal of a mode sensing unit 30, and drives the camera part 20 corresponding to the selected image-taking mode. For example, if signals that indicate an ON state of the DSC 22 and an OFF state of the DVC 24 are input from the mode sensing unit 30, the control unit 90 ascertains that the image-taking mode of the camera part 20 is the still image mode. Also, if the image-taking command signal is applied from the image-taking key 70*a*, the control unit 90 drives the DSC 22 corresponding to the still image mode. If a record command signal is applied from the input unit 70, the control unit 90 controls the still image codec unit 50 to compress the image signal of the object; if a reproduction command signal is applied, the control unit 90 controls the still image codec unit 50 to discontinue the compression of the image signal, and then displays the image signal on the display unit 80.

As described above, the DSC and the DVC have memories for storing image information and in the case of integrating the two appliances, the size of the digital camera is increased, and the operating system for controlling the respective systems is complicated.

SUMMARY OF THE INVENTION

Therefore, an object of the present invention is to provide a memory control apparatus and method for digital signal processing. More particularly, exemplary embodiments of the present invention provide a system and method for operating a plurality of digital signal processors using one memory card.

Accordingly, an exemplary embodiment of the present invention provides a memory control apparatus and method for operating with a plurality of digital signal processors (DSPs). The memory control apparatus and method employ a switch for selectively routing signals for input to the DSPs from a memory and for output from the DSPs to the memory, a buffer for selectively outputting to the DSPs memory information indicating that the memory is available, and a controller for controlling the switch to route the signals to and from the memory and DSPs and to control the buffer to selectively output memory information. The memory can be a removable memory, such as a flash memory, and the memory information can indicate that the memory has been inserted into a port for access by the memory control apparatus. The switch comprises a plurality of selection switches, coupled between the DSPs and the memory, which are controlled by the controller. The buffer comprises a three-state buffer which selectively outputs the memory information of the memory to the DSPs as controlled by the controller.

Exemplary embodiments of the present invention further employ a key input unit for indicating an operation mode such that the control unit controls recording of data in the memory or reproduction of data from the memory according to the operation mode indicated by the key input unit. In an exemplary implementation, one of the DSPs couples to a digital still camera and another of the DSPs couples to a digital video camera, and the controller controls the switch to route the signals to and from the memory and the DSPs of the digital still camera and digital video camera.

BRIEF DESCRIPTION OF THE DRAWINGS

The above and other objects, exemplary features and advantages of the present invention will become more apparent from the following detailed description of certain exemplary embodiments when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
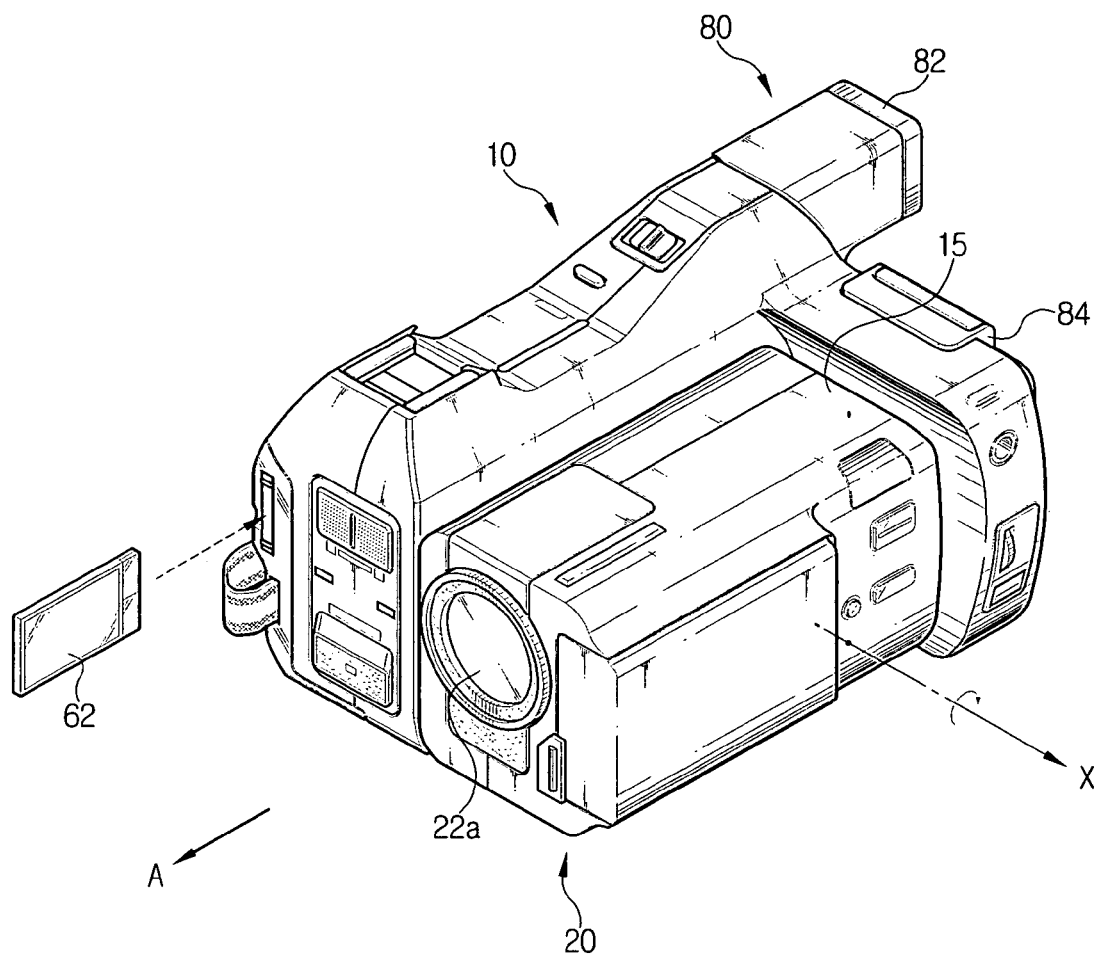
FIG. 1 is a perspective view illustrating a conventional apparatus for taking an image in which a digital still camera and a digital video camera are integrated.
Figure 2:
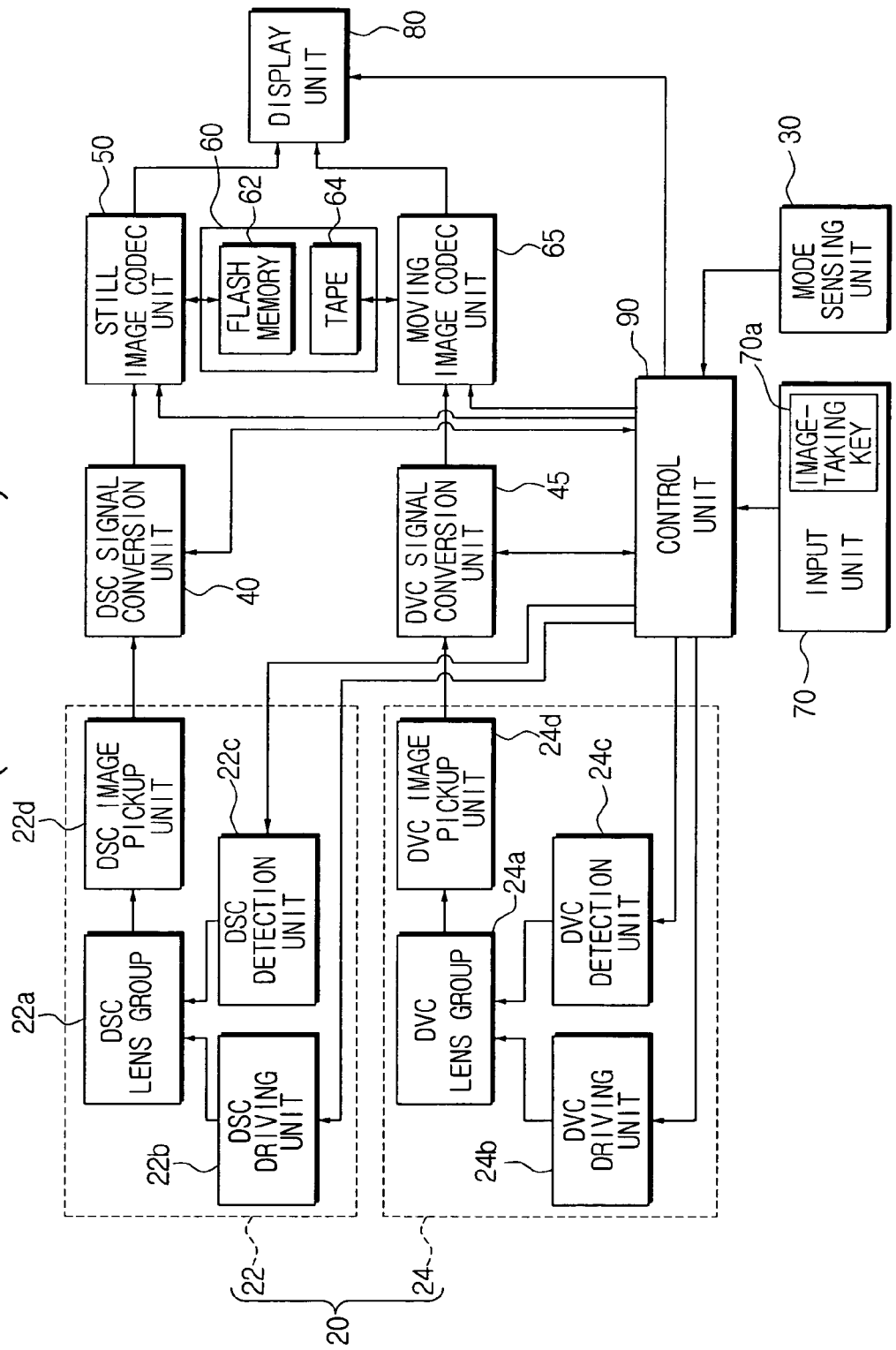
FIG. 2 is a block diagram of the conventional apparatus illustrated in FIG. 1.
Figure 3:
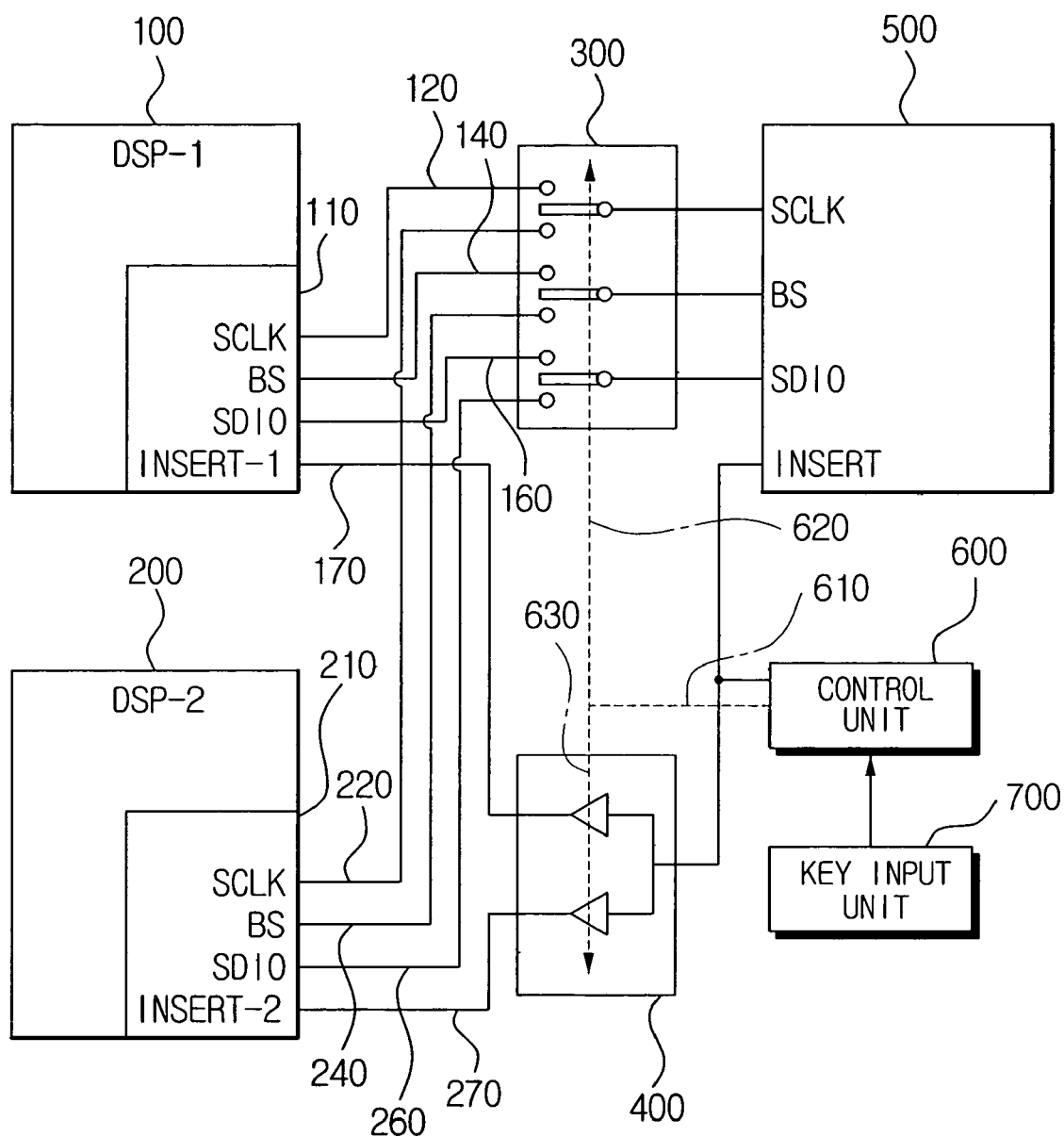
FIG. 3 is a block diagram illustrating main signal processing blocks according to an exemplary embodiment of the present invention.

FIG. 3 is a block diagram illustrating the main signal processing blocks of a digital signal process according to an exemplary embodiment of the present invention. In the exemplary embodiment illustrated by FIG. 3, the memory control apparatus for a digital signal process comprises a signal processing unit 100 for a digital still camera (hereinafter referred to as "DSP-1"), a signal processing unit 200 for a digital video camera (hereinafter referred to as "DSP-2"), a memory 500, a selection switch 300, a three-state buffer 400, a key input unit 700, and a control unit 600. The memory 500 can be a removable memory, such as a memory card or stick.

The DSP-1 100 and the DSP-2 200 process digital signals of the digital still camera and the digital video camera, respectively. DSP-1 and DSP-2 have interface units 110 and 210 for performing digital signal input/output with the memory 500. The interface units 110 and 210 are provided, respectively, with clock terminals (SCLK) 120 and 220, data terminals (SDIO) 160 and 260, enable terminals (BS) 140 and 240, and insert-1 and insert-2 terminals 170 and 270 which are signal terminals that indicate the memory 500 has been inserted for implementations having removable memory.

The memory 500 can record or reproduce the digital signal, and has a clock terminal (SCLK), a memory enable terminal (BS), a data terminal (SDIO), and an insert terminal for outputting a signal indicating that the memory stick 500 has been inserted.

Also, the memory 500 may be a semiconductor type flash memory which can be installed in the signal processing apparatus, or a card type flash memory such as CF CARD, SD CARD, SMC CARD, MMC CARD, and so on, which is detachable from the apparatus. The selection switch 300 selects and connects signals input/output among the DSP-1 100, DSP-2 200, and the memory 500.

The three-state buffer 400 receives the insert signal which indicates the insertion of the memory 500, and outputs the insert signal to the insert-1 and insert-2 terminals 170 and 270 under the control of control unit 600 so that the respective DSPs can communicate with the memory 500. The control unit 600 receives the key input from the key input unit 700, and outputs a control signal 620 for switching the selection switch 300 and a control signal 630 for controlling the three-state buffer 400. The control unit 600 also controls the entire system.

The key input unit 700 is provided with a key for selecting a DSC mode and a DVC mode, and system control keys for the recording/reproducing operation. In an exemplary implementation, the mode selection may be performed through a rotary contact switch operable without a separate key input. That is, the rotary contact switch senses the image-taking mode corresponding to the digital still camera or the digital video camera in accordance with the rotating angle of the camera part 20 relative to the main body 10. The control unit 600 can sense the image-taking mode corresponding to the camera part 20 based on an angle of 180° or about 180° when the camera part 20 is rotated.

An example of an operation of the memory control apparatus for a digital signal process as described above will now be provided.

Figure 4:
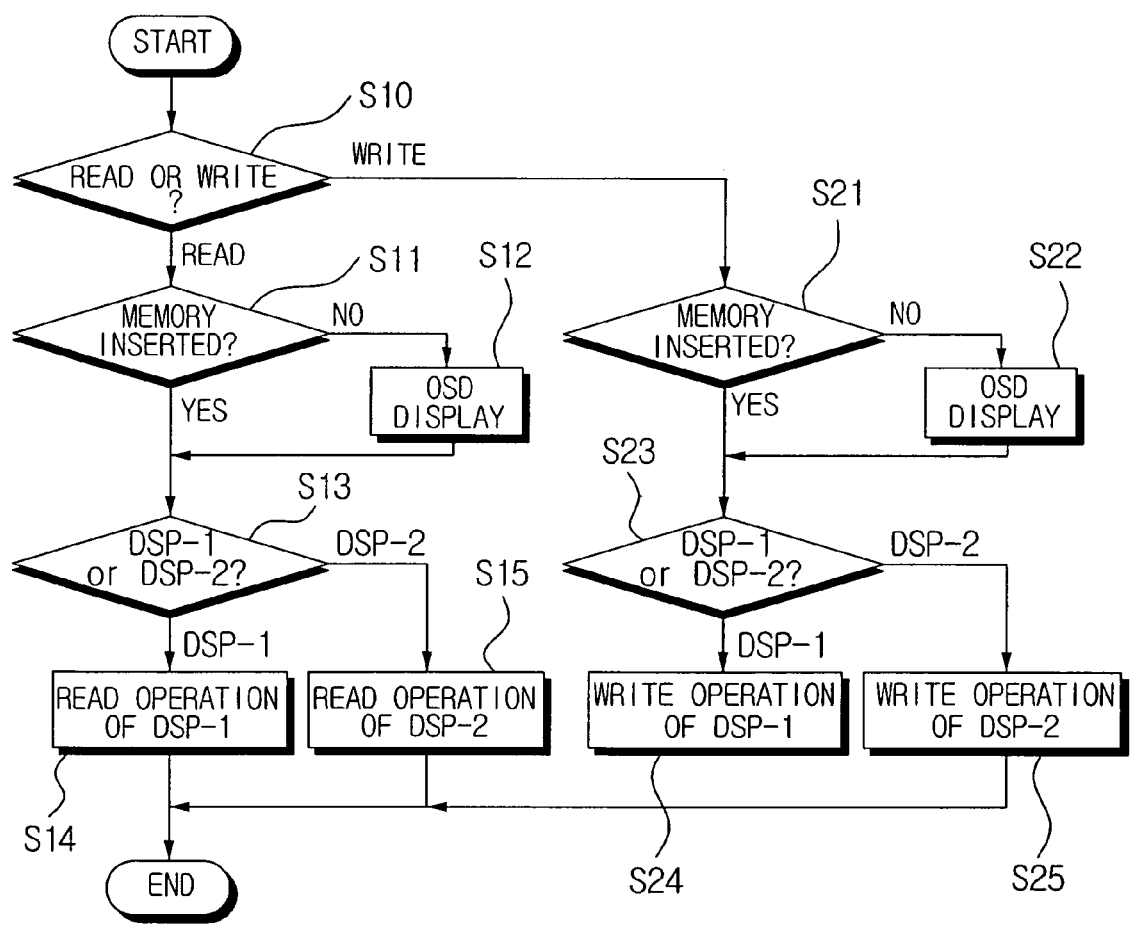
FIG. 4 is a flowchart illustrating a main signal process according to an exemplary embodiment of the present invention.

FIG. 4 is a flowchart illustrating an example of an operation of the memory control apparatus for a digital signal process according to an exemplary embodiment of the present invention.

The control unit 600 determines whether the present mode is a read mode or a write mode through the key input unit 700 (step S10). If the control unit 600 determines that the present mode is the read mode, the control unit 600 determines whether memory 500 is inserted by interpreting the insert signal (step S11). If it is determined that the memory 500 is not inserted, the control unit 600 controls an On-Screen Display (OSD) unit (not illustrated) to display that the memory 500 is not inserted (step S12). Then, the control unit 600 determines whether to select the DSP-1 mode or the DSP-2 mode through the key input unit 700 (step S13). If the DSP-1 mode is selected, that is, the digital still camera mode is selected (step S14), the control unit 600 controls the selection switch 300 so that the signals of the memory 500 can be connected to the respective terminals of the DSP-1. Specifically, the control unit 600 controls the clock terminal SCLK of memory 500 to be connected to the clock terminal (SCLK) 120 of the DSP-1 100, and controls output of the enable terminal BS and the data terminal SDIO of memory 500 to be connected to the enable terminal (BS) 140 and the data terminal SDIO 160 of the DSP-1 100. The control unit 600 simultaneously outputs the control signal 620 for providing the insert signal to DSP-1 100 indicating insertion of the memory 500, and which is input to the three-state buffer 400 via control signal 630. Control signal 610 comprises an aggregate of control signals 620 and 630.

The control unit 600 controls the system so that DSP-1 100 reproduces the digital signal stored in the memory 500 and displays the reproduced signal on the display unit (not illustrated).

If the DSP-2 mode is selected, that is, the digital video camera mode is selected at step S13 (step S15), the control unit 600 controls the selection switch 300 through the same process as above so that the terminal signals of the memory 500 are connected to the respective terminals of the DSP-2 200. The control unit 600 simultaneously outputs the control signal 620 for providing the insert signal to DSP-2 200 indicating insertion of the memory 500, which is input to the three-state buffer 400 via control signal 630. The control unit 600 controls the system so that DSP-2 200 reproduces the digital signal stored in the memory 500 and displays the reproduced signal on the display unit (not illustrated).

Alternatively, if the write mode is selected at step S10, the control unit 600 determines whether the memory 500 is inserted by interpreting the insert signal (step S21). If control unit 600 determines that the memory 500 is not inserted, the control unit 600 controls the OSD unit (not illustrated) to display that the memory 500 is not inserted (step S22). The control unit 600 determines whether to select DSP-1 mode or DSP-2 mode through the key input unit 700 (step S23). If the DSP-1 mode is selected, that is, the digital still camera mode is selected (step S24), the control unit 600 controls the selection switch 300 so that the signals of the terminals of the DSP-1 can be connected to the respective terminals of the memory 500.

The control unit 600 simultaneously outputs the control signal 620 to provide the insert signal to DSP-1 100 indicating insertion of the memory 500, which is input to the three-state buffer 400 via control signal 630. The control unit 600 controls the system so that the signals output from DSP-1 100 are stored in the memory 500.

If the DSP-2 mode is selected, that is, the digital video camera mode is selected at step S23 (step S25), the control unit 600 controls the selection switch 300 using the same process as above so that the output signals of the respective terminals of the DSP-2 200 are connected to the respective terminals of the memory 500. The control unit 600 simultaneously outputs the control signal 620 for providing the insert signal, which is input to the three-state buffer 400 via control signal 630, to the DSP-2 200. The control unit 600 controls the system so that the output signals of DSP-2 200 are stored in the memory 500.

According to the memory control apparatus and method for digital signal processing of the exemplary embodiments of the present invention described above, the memory and buffer are commonly used when a plurality of DSPs are processed, and thus an operating system having a simple construction is provided.

While the present invention has been particularly shown and described with reference to certain exemplary embodiments thereof, it will be understood by those of ordinary skill in the art that various changes in form and detail may be made therein without departing from the spirit and scope of the invention as defined by the appended claims and equivalents thereof.

What is claimed is:

1. A memory control apparatus for operating with a plurality of digital signal processors (DSPs), the memory control apparatus comprising:
    a switch for selectively routing signals for input to the DSPs from a memory and for output from the DSPs to the memory;
    a controller for controlling the switch to route the signals to and from the memory and DSPs; and
    a buffer having only a single electrical line connection to the memory and to each of the plurality of the DSPs, wherein the single connection is a direct connection to one insert terminal provided in the memory and in each of the plurality of the DSPs, wherein the buffer receives memory information comprising an insert signal from the memory and outputs the insert signal to the insert terminals of the DSPs for selectively outputting to the DSPs information indicating that the memory is available.

2. The memory control apparatus of claim 1, wherein the controller controls the buffer to selectively output the memory information.

3. The memory control apparatus of claim 2, wherein the buffer comprises a three-state buffer which selectively outputs the memory information of the memory to the DSPs as controlled by the controller.

4. The memory control apparatus of claim 1, wherein the memory is a removable memory and the memory information indicates that the memory has been inserted into a port for access by the memory control apparatus.

5. The memory control apparatus of claim 4, wherein the memory is a flash memory.

6. The memory control apparatus of claim 1, wherein the switch comprises a plurality of selection switches, coupled between the DSPs and the memory, which are controlled by the controller.

7. The memory control apparatus of claim 1, further comprising:
   a key input unit for indicating an operation mode,
   wherein the controller controls recording of data in the memory and reproduction of data from the memory according to the operation mode indicated by the key input unit.

8. The memory control apparatus of claim 1, wherein one of the DSPs couples to a digital still camera and another of the DSPs couples to a digital video camera, and
   wherein the controller controls the switch to route the signals to and from the memory and the DSPs of the digital still camera and digital video camera.

* * * * *